United States Patent [19]

Hickey

[11] Patent Number: 5,075,564
[45] Date of Patent: Dec. 24, 1991

[54] COMBINED SOLAR AND WIND POWERED GENERATOR WITH SPIRAL SURFACE PATTERN

[76] Inventor: John J. Hickey, 27 Bowdoin St., Apt. 4A, Boston, Mass. 02114

[21] Appl. No.: 484,042

[22] Filed: Feb. 23, 1990

Related U.S. Application Data

[63] Continuation-in-part of Ser. No. 454,026, Dec. 19, 1989.

[51] Int. Cl.$^5$ .................................................. F03D 11/00
[52] U.S. Cl. ........................................... 290/55; 290/44
[58] Field of Search .................................... 290/44, 55

[56] References Cited

U.S. PATENT DOCUMENTS

| | | | |
|---|---|---|---|
| 218,438 | 8/1989 | Heath | 416/231 R |
| 265,984 | 10/1882 | Schmolz | 416/189 |
| 1,331,997 | 2/1920 | Neal | 416/198 R |
| 1,861,065 | 5/1932 | Poot | 416/235 |
| 1,903,823 | 4/1933 | Lougheed | 244/200 |
| 2,238,749 | 4/1941 | Peltier | 416/203 |
| 3,463,418 | 8/1969 | Miksch | 244/199 |
| 3,612,446 | 10/1971 | Lebert | 244/35 R |
| 4,023,368 | 5/1977 | Kelly | 60/698 |
| 4,119,863 | 10/1978 | Kelly | 290/55 |
| 4,159,427 | 6/1979 | Wiedemann | 290/55 |
| 4,369,629 | 1/1983 | Lockwood | 290/55 |
| 4,433,544 | 2/1984 | Wells et al. | 290/55 |
| 4,551,631 | 11/1985 | Trigilio | 290/55 |
| 4,585,318 | 4/1986 | Seifert | 353/3 |
| 4,872,484 | 10/1989 | Hickey | 137/561 R |

FOREIGN PATENT DOCUMENTS

| | | | |
|---|---|---|---|
| 112792 | 7/1984 | European Pat. Off. | 290/55 |
| 2604175 | 8/1977 | Fed. Rep. of Germany | 290/55 |
| 55-164590 | 12/1980 | Japan . | |

OTHER PUBLICATIONS

Report on Stork Airfoil Failures, *Windpower Monthly*, Aug. 1988.
Design Not at Fault Reports Blades Investigation *Windpower Monthly*, Feb. 1989.
Technical Diary—Future Needs Close Cooperation Between Mathematicians and Manufacturers, *Windpower Monthly*, Apr. 1988.
Technical Diary—An Aristocratic Pedigree is Not Arrived at Overnight *Windpower Monthly*, Mar. 1988.
Whirl Flutter Analysis of a Horizontal-Axis Wind Turbine with a Two-Bladed Teetering Rotor, *Solar Energy*, vol. 31, No. 2, pp. 173-182, 1983 (Great Britian).
Technical Diary—Wind Turbines Regularly Abuse the Rules of Engineering, *Windpower Monthly*, Feb. 1988.
Is the Wind A Practical Source of Energy for You? *Information, U.S. Department of Energy*, SD 101, 3rd Ed., Dec. 1985.
Wind Energy Systems *Information, U.S. Department of Energy*, FS 135, 2nd Ed., Oct. 1985.
Energy From the Wind *U.S. Department of Energy*, Jul. 1987, DOE/CE-0189.

*Primary Examiner*—A. D. Pellinen
*Assistant Examiner*—R. L. Hoover
*Attorney, Agent, or Firm*—Weingarten, Schurgin, Gagnebin & Hayes

[57] ABSTRACT

A combination solar and wind powered generator including a wind generator, responsive to the flow of air currents, for converting mechanical energy into electrical energy. The wind generator includes a plurality of air engaging vanes which are rotatably supported by the wind generator, and operative for intercepting the flow of air currents for producing mechanical energy. The wind generator also includes an electric generator apparatus coupled to the plurality of air engaging vanes, for transforming the mechanical energy into a first source of electrical energy. A plurality of light sensitive cells, disposed proximate the air engaging vanes, are adapted for transforming light energy into a second source of electrical energy. The air engaging vanes may includes a plurality of surface deviations for altering the flow of air currents intercepted by the vanes and for directing light energy onto the light sensitive cells.

11 Claims, 3 Drawing Sheets

COMBINED SOLAR AND WIND POWERED GENERATOR WITH SPIRAL SURFACE PATTERN

CONTINUATION APPLICATION

This application is a continuation-in-part of Application Ser. No. 07/454,026, filed Dec. 19, 1989 entitled "System for Controlling the Flow of a Fluid Medium Relative to an Object".

FIELD OF THE INVENTION

This invention relates to generators for providing electricity from renewable energy sources such as the wind and the sun.

BACKGROUND OF THE INVENTION

In recent years, varying attention has been given to generating electricity from renewable, pollution-free, energy sources such as the sun, wind and water. To date, no single method has proved sufficiently cost effective to warrant large scale investment and implementation. For example, water levels and flowage rates vary seasonally, clouds often obscure the sun and winds may not be consistent.

The majority of the prior art attempting to provide generators for producing electricity from renewable energy sources have focused on a single generator type such as wind turbines or solar cell arrays.

A few attempts have been made to provide generators adapted to provide electricity from two renewable energy sources. For example, systems disclosed in U.S. Pat. No. 4,551,631 entitled Wind and Solar Electric Generating Plant and; U.S. Pat. No. 4,119,863 entitled Combined High Density Solar Panels and Vertical Wind Turbines; all provide a source of wind and solar power generators in one location. In each of the prior art references, however, the systems include a separate wind generator or turbine which has a roof or other similar covering containing an array of solar cells. Although the platform or roof housing the solar cells may provide an additional source of energy when the sun is shining, the platform also serves to divert the natural wind flow, thereby altering the effectiveness of the wind turbine. In addition, such a system results in additional cost for the construction of the roof platform, as well as added maintenance for the additional structure. Further, many areas of the country which receive substantial snowfall are not well suited for utilizing these systems.

SUMMARY OF THE INVENTION

A system for producing electrical energy from multiple renewable energy sources such as the wind and the sun, is disclosed which provides a compact, lower cost, lower maintenance, environmentally sound source of electrical energy. The two sources for generating electricity are contained in the same structure, and operate simultaneously yet independently of one another. The combined solar and wind powered generator includes a wind generator responsive to the flow of air currents for converting mechanical energy into electrical energy. The wind generator includes a plurality of air engaging vanes having first and second surfaces. The air engaging vanes are rotatably supported by the wind generator and operative for intercepting the flow of air currents to produce mechanical energy. An electric generator transforms the mechanical energy into a first electrical energy source. A plurality of light sensitive cells are disposed proximate at least one surface of the plurality of air engaging vanes and are adapted for transforming light energy striking the cells into a second source of electrical energy.

In a preferred embodiment, the light sensitive cells are disposed within a cavity formed by the first and second surfaces of the vanes while at least one of the surfaces of the vanes includes a light energy transparent material to allow the light energy striking the surface of the vane to be transmitted to the light sensitive cells disposed within the cavity. In the preferred embodiment, at least one light energy transparent surface further includes a plurality of surface deviations which act to converge the light striking the surface and direct it to the plurality of light sensitive cells located in the vane cavity. In addition, the air engaging vanes also include a plurality of surface deviations adapted for altering the flow of air currents striking the vane for increasing the mechanical energy and ultimately the electrical energy produced by the wind generator. The plurality of surface deviations may include a plurality of radially extending sets which have a curvilinear or spiral form. Additionally, the preferred embodiment also includes apparatus for converting one of said AC or DC electrical energies produced by the wind generator and light sensitive cells respectively into the other type of electrical energy.

DESCRIPTION OF THE DRAWINGS

These and other features of the present invention will be more readily understood by reading the following detailed description, taking together with the drawings, wherein.

DETAILED DESCRIPTION OF THE INVENTION

Figure 1:
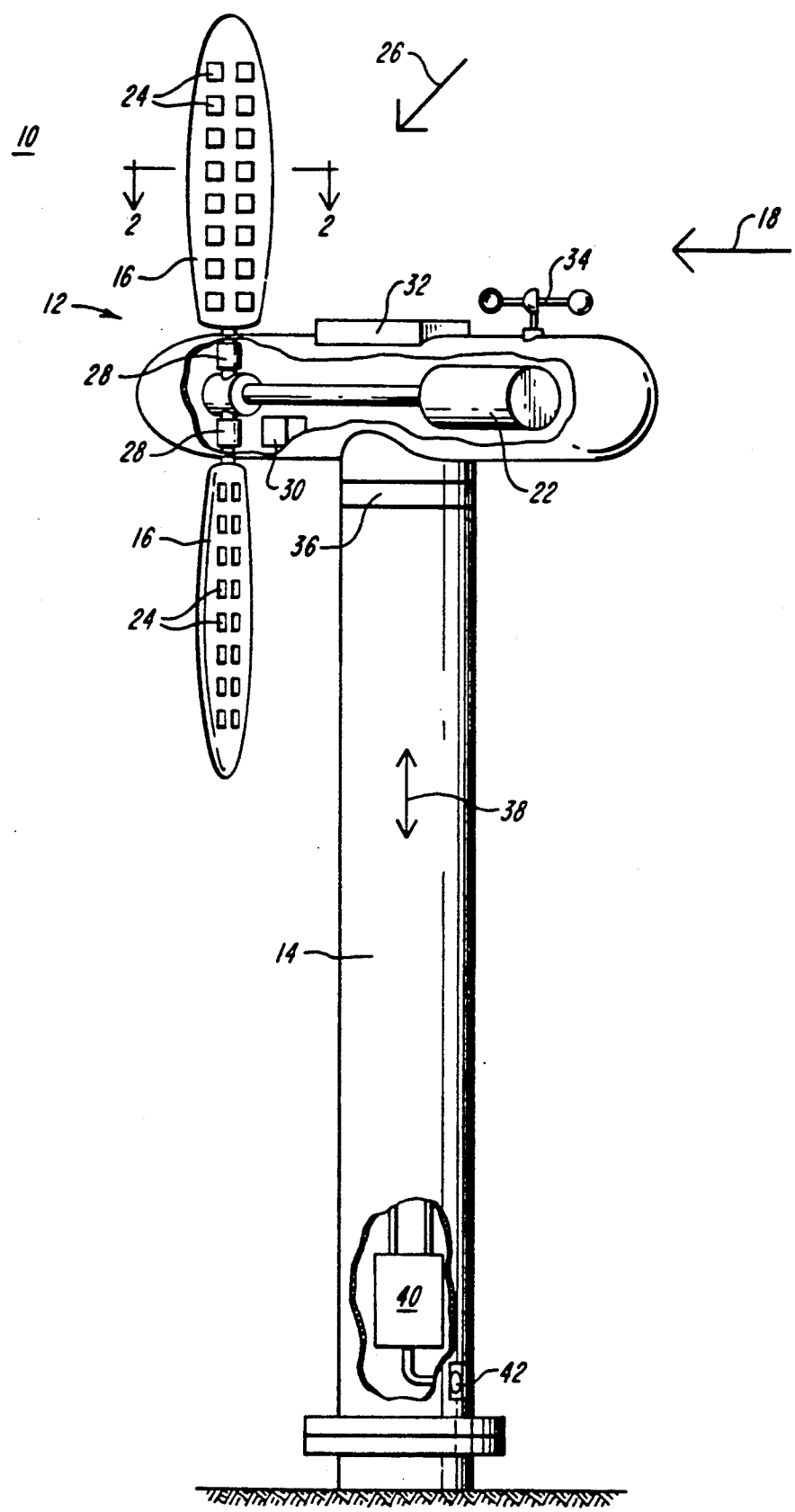
FIG. 1 is a side view of a combined solar and wind power generator according to this invention mounted to a supporting tower.

As illustrated in FIG. 1, the combination solar and wind power generator 10, includes wind generator 12 mounted atop support tower 14. Wind generator 12 includes a plurality of air engaging vanes 16 rotatably supported by wind generator 12 and operative for intercepting the flow of air currents illustrated by arrow 18 for producing rotational mechanical energy. The rotational mechanical energy is transferred to drive shaft 20 which is coupled to electric generator 22. Electric generator 22 transforms the rotational mechanical energy into electrical energy. Typically, electric generator 22 produces AC electrical energy although DC generators are readily available and well known in the art.

Air engaging vanes 16 include a plurality of light sensitive cells 24 disposed on at least one surface of the air engaging vanes. Light sensitive cells 24 are adapted for receiving light energy 26 and for transforming the light energy into electrical energy which is typically DC energy.

In a preferred embodiment, the combination solar and wind generator is equipped with motors 28 coupled to air engaging vanes 16 and responsive to control apparatus 30 for varying the angle at which air engaging vanes 24 intercept air currents 18 and the angle at which light sensitive cells 24 receive light energy 26. Control apparatus 30 is responsive to sensors monitoring external conditions. Sensors may include a monitor 32 which monitors the angle of light energy 26 with respect to the combined solar and wind generator 10 and wind speed/direction indicator 34. Control apparatus 30 is operative for converting control signals received from the external condition sensors and for producing motor control signals to control motors 28 and air engaging vanes 16. Additionally, support tower 14 may also include a bearing 36 which allows wind generator 12 to rotate about axis 38. Control apparatus 30 may also be operative to energize heating elements (not shown) on the air engaging vanes and combined wind/solar generator for melting ice and snow which may accumulate on the generator and associated parts.

The event that the wind generator and the light sensitive cells produce varying types of electrical energy, for example in the event that wind generator 12 produces AC electrical energy and light sensitive cells 24 produce DC electrical energy, the combination solar and wind power generator 10 includes converter apparatus 40 adapted for receiving the AC and DC energies and for providing a single electrical energy output 42 by means of an AC to DC converter or a DC to AC inverter, both of which are well known in the art.

Although shown as a horizontally mounted wind turbine, it is contemplated that the combination solar and wind power generator of this invention could be implemented in a vertical wind generator as well as any other variation in mounting. Additionally, the solar cells may be disposed on other types of rotating vanes such as helicopter blades.

Figure 2:
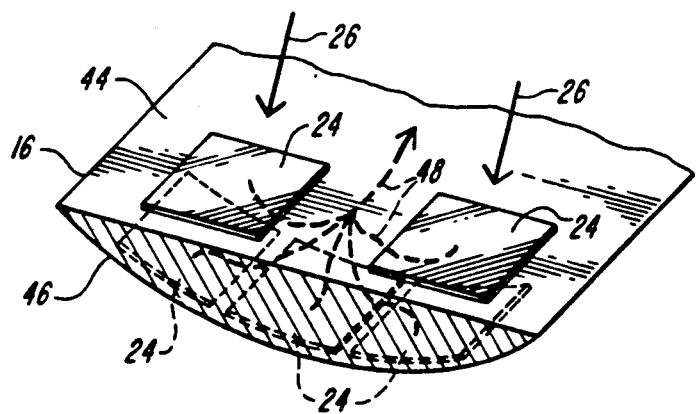
FIG. 2 is a cross sectional view of a wind generator air engaging vane of FIG. 1 taken along lines 2—2.

Air engaging vane 16, shown in cross section in FIG. 2, includes light sensitive cells 24 more commonly referred to as solar cells. Light sensitive cells 24 are located on at least one of surfaces 44 or 46 of air engaging vanes 16. Light sensitive cells 24 are adapted for receiving light energy 26 and for transforming the light energy into electrical energy which is coupled to wiring 48.

Figure 3:
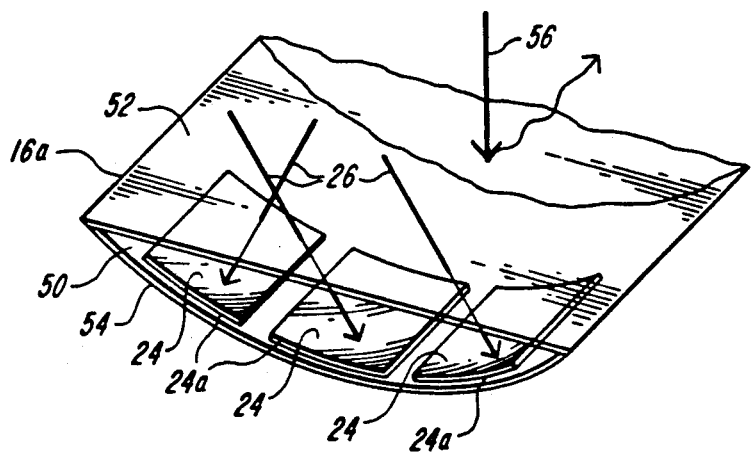
FIG. 3 is an cross sectional view of an alternative embodiment of a wind generator vane wherein the vane has a light transparent surface with the light sensitive cells are disposed within a cavity of the vane.

A preferred embodiment illustrated in FIG. 3, includes air engaging vane 16a having a cavity 50 formed by first surface 52 and second surface 54. First surface 52 is comprised of a clear or light energy transparent material such as plastic, which is weather resistant, and serves to enclose and protect light sensitive cells 24 mounted within cavity 50 from deterioration due to external elements such as rain and snow. Clear or transparent surface 52 is adapted for allowing light energy 26 to enter cavity 50 and impinge upon light sensitive cells 24. Additionally, surface 52 or the transparent material itself may include an ultraviolet light filter to reflect damaging ultraviolet energy 56 away from light sensitive cells 24 thus inhibiting or retarding the breakdown of light sensitive cells 24 by such ultraviolet energy. Further, second surface 54 may also be clear or transparent in which case the embodiment may include a second array 24a of light sensitive cells positioned back-to-back with respect to first array 24.

Figure 4:
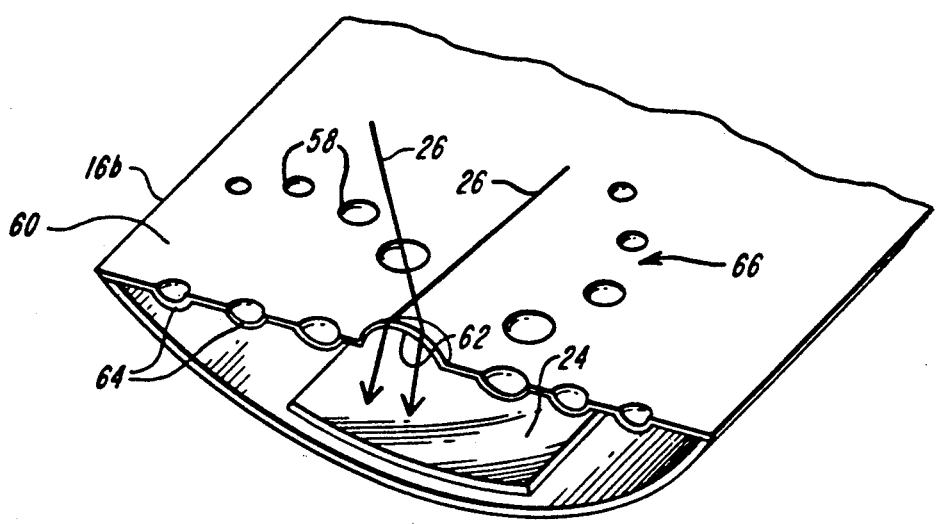
FIG. 4 is a cross sectional view of an alternative embodiment of an air engaging vane incorporating a plurality of surface deviations to focus light energy onto the solar cells and to provide additional mechanical energy to the wind generator.

As illustrated in the embodiment shown in FIG. 4, air engaging vanes 16b include a plurality of deviations 58 in surface 60. The surface deviations may include convex projections 62 which serve to redirect and converge light energy 26 striking surface 60 onto light sensitive cell 24. A second type of deviation may include concave surface deviations 64 which serve to alter the air currents striking air engaging vanes 16b and Provide greater driving force against the vanes thereby producing a greater amount of rotational mechanical energy and ultimately a greater amount of electrical energy. Surface deviations 64 may be grouped into curvilinear radially extending deviation sets 66 and are described in greater detail in my U.S. Pat. No. 4,872,484 entitled System for Affecting the Flow of a Medium issued to the inventor of the present invention, the disclosure of which is incorporated herein by reference.

Figure 5:
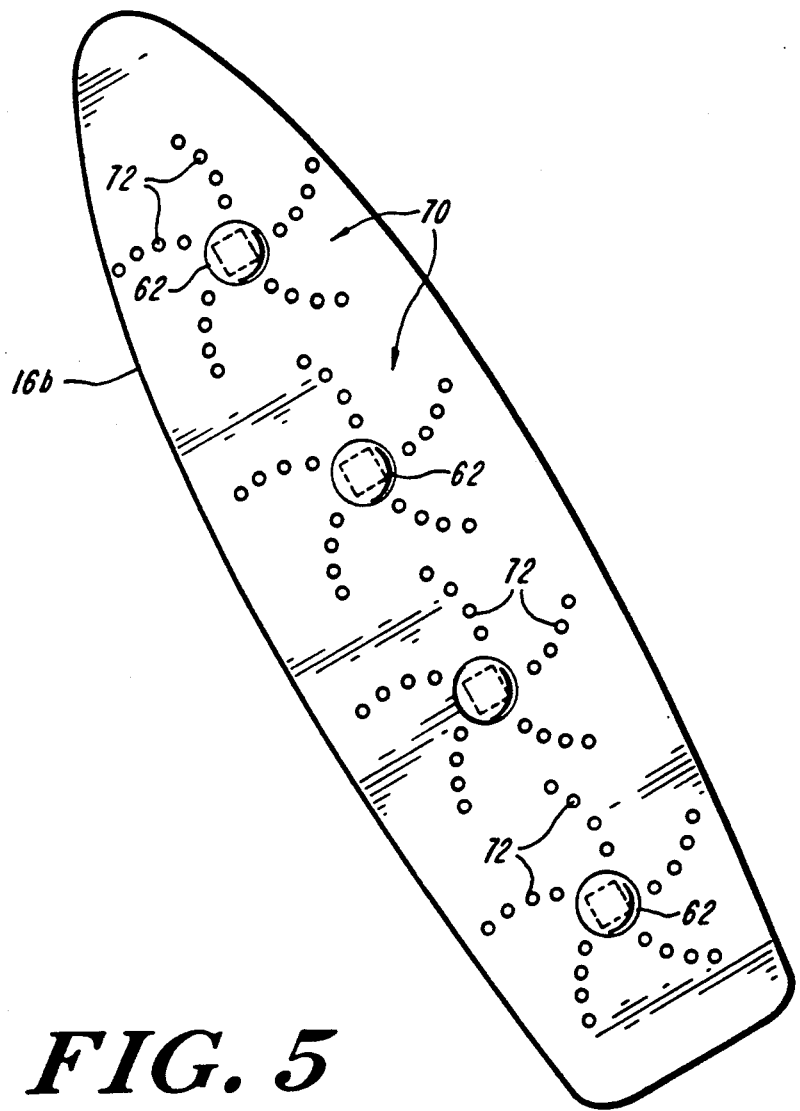
FIG. 5 is a top view of the wind generator vane of FIG. 4.

A top view of an air engaging vane 16b is shown in FIG. 5 and includes a plurality of surface deviation patterns 70 each of which comprises a central deviation 62 which, in the preferred embodiment, is a convex protrusion, from which extend curvilinear deviation sets 72. Deviation sets 72 include a plurality of concave surface deviations for affecting the flow of air striking the surface of air engaging vanes 16b.

Thus, the present invention provides a combined solar and wind powered generator with spiral patterns for enhancing the generation of electrical energy by the wind generator. The present invention has been designed with and according to the laws of nature. The spiral pattern of the surface deviations is common in nature as evidenced by the spiral pattern found in a hurricane, our galaxy, the movement of the wind, and living creatures such as the Ammonite.

Modifications and substitutions to the present invention by one of ordinary skill in the art are considered to be within the scope of the present invention and the claims which follow.

I claim:

1. A combination solar and wind power generator comprising:

a wind generator, responsive to the flow of air currents, for converting mechanical energy into electrical energy;

said wind generator including a plurality of air engaging vanes having at least first and second surfaces, said first and second surfaces forming a cavity internal to said air engaging vanes, said air engaging vanes rotatably supported by said wind generator and operative for intercepting a flow of air currents for producing mechanical energy;

said wind generator also including an electric generator apparatus coupled to said plurality of air engaging vanes, for transforming said mechanical energy into a first source of electrical energy;

at least one of said first and second surfaces of said air engaging vanes including a material which is light energy transparent;

at least a first plurality of surface deviations disposed on at least one of said first or second surfaces, said plurality of surface deviations arranged in a plurality of curvilinear deviation sets, said plurality of deviation sets extending radially from a central point and forming a spiral pattern of said surface deviations; and a plurality of light sensitive cells, disposed within said cavity internal too said air engaging vanes, responsive to light energy striking said light sensitive cells through at least one light energy transparent surface of said air engaging vanes, and adapted for transforming light energy striking said light sensitive cells into a second source of electrical energy.

2. The system of claim 1 in which said at least one light energy transparent surface includes a plurality of convex surface deviations, for directing and converging said light energy passing through the at least one surface of said air engaging vanes onto said light sensitive cells disposed in the cavity of the vane.

3. The system of claim 1 in which said spiral deviation sets radiate from a central common deviation.

4. The system of claim 3 in which said common central deviation includes a convex deviation, for directing and converging said light energy striking at least one surface of said air engaging vane onto said light sensitive cells disposed in the cavity of said air engaging vane.

5. The system of claim 1 in which said at least one transparent surface includes an ultraviolet light filter for preventing ultraviolet light energy from reaching said plurality of light sensitive cells.

6. The system of claim 1 in which said electric generator apparatus produces AC electrical energy, and said plurality of light sensitive cells produce DC electrical energy.

7. The system of claim 6 further including means for converting one of said AC or DC electrical energy into the other type of electrical energy.

8. The system of claim 1 further including a second plurality of light sensitive cells disposed within said cavity internal too said air engaging vanes, responsive to light energy striking said light sensitive cells through a second light energy transparent surface of said air engaging vanes, for transforming light energy striking said second plurality of light sensitive cells into a second source of electrical energy.

9. The system of claim 1 wherein said first plurality of deviations are concave.

10. The system of claim 1 wherein said first plurality of deviations are convex.

11. The system of claim 1 wherein said first plurality of deviations include both concave and convex deviations.

* * * * *